(12) United States Patent
Yin et al.

(10) Patent No.: US 12,639,870 B1
(45) Date of Patent: May 26, 2026

(54) UNIFIED DIFFUSION MODEL FOR IMAGE GENERATION AND/OR EDITING

(71) Applicant: Reve AI, Inc., Palo Alto, CA (US)

(72) Inventors: Tianwei Yin, Palo Alto, CA (US); Taesung Park, Palo Alto, CA (US)

(73) Assignee: REVE AI, INC., Palo Alto, CA (US)

( * ) Notice: Subject to any disclaimer, the term of this patent is extended or adjusted under 35 U.S.C. 154(b) by 0 days.

(21) Appl. No.: 19/327,928

(22) Filed: Sep. 12, 2025

(51) Int. Cl.
| | |
|---|---|
| *G06T 11/00* | (2026.01) |
| *G06T 5/60* | (2024.01) |
| *G06T 5/70* | (2024.01) |
| *G06T 11/60* | (2006.01) |

(52) U.S. Cl.
CPC ............... *G06T 11/60* (2013.01); *G06T 5/60* (2024.01); *G06T 5/70* (2024.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 12,136,151 | B2 * | 11/2024 | Epstein | ................... G06T 11/00 |
| 12,380,569 | B1 * | 8/2025 | Park | .......................... G06T 7/50 |

| | | | | |
|---|---|---|---|---|
| 2024/0013504 | A1 * | 1/2024 | Yu | ........................... G06V 10/80 |
| 2024/0096074 | A1 * | 3/2024 | Okorn | .................. G06N 3/0455 |
| 2024/0153093 | A1 * | 5/2024 | Xu | ........................... G06V 20/70 |
| 2024/0153194 | A1 * | 5/2024 | Liu | .......................... G06F 40/30 |
| 2024/0161462 | A1 * | 5/2024 | Gandelsman | ............. G06T 5/60 |
| 2024/0338829 | A1 * | 10/2024 | Katakol | .................. G06T 7/194 |

* cited by examiner

*Primary Examiner* — Martin Mushambo

(74) *Attorney, Agent, or Firm* — Pillsbury Winthrop Shaw Pittman, LLP

(57) ABSTRACT

Systems and methods are disclosed for training and executing a unified diffusion model that jointly reconstructs images and layouts under a unified objective. The system may access image-layout-prompt triplets, each comprising an image, a layout, and a guiding prompt. The system may independently sample an image noise level from a first distribution and a layout noise level from a second distribution, then corrupt each modality according to the selected noise levels. The system may encode the prompt into conditioning embeddings and provide the corrupted modalities and embeddings to the unified diffusion model. The system may cause the model to generate a reconstructed image and layout, and update model parameters based on a loss function balancing fidelity across both modalities. By independently sampling noise levels, the system may expose the model to diverse training conditions, enabling generalization across tasks such as image-to-layout prediction, layout-to-image generation, joint synthesis, and instruction-based editing.

20 Claims, 6 Drawing Sheets

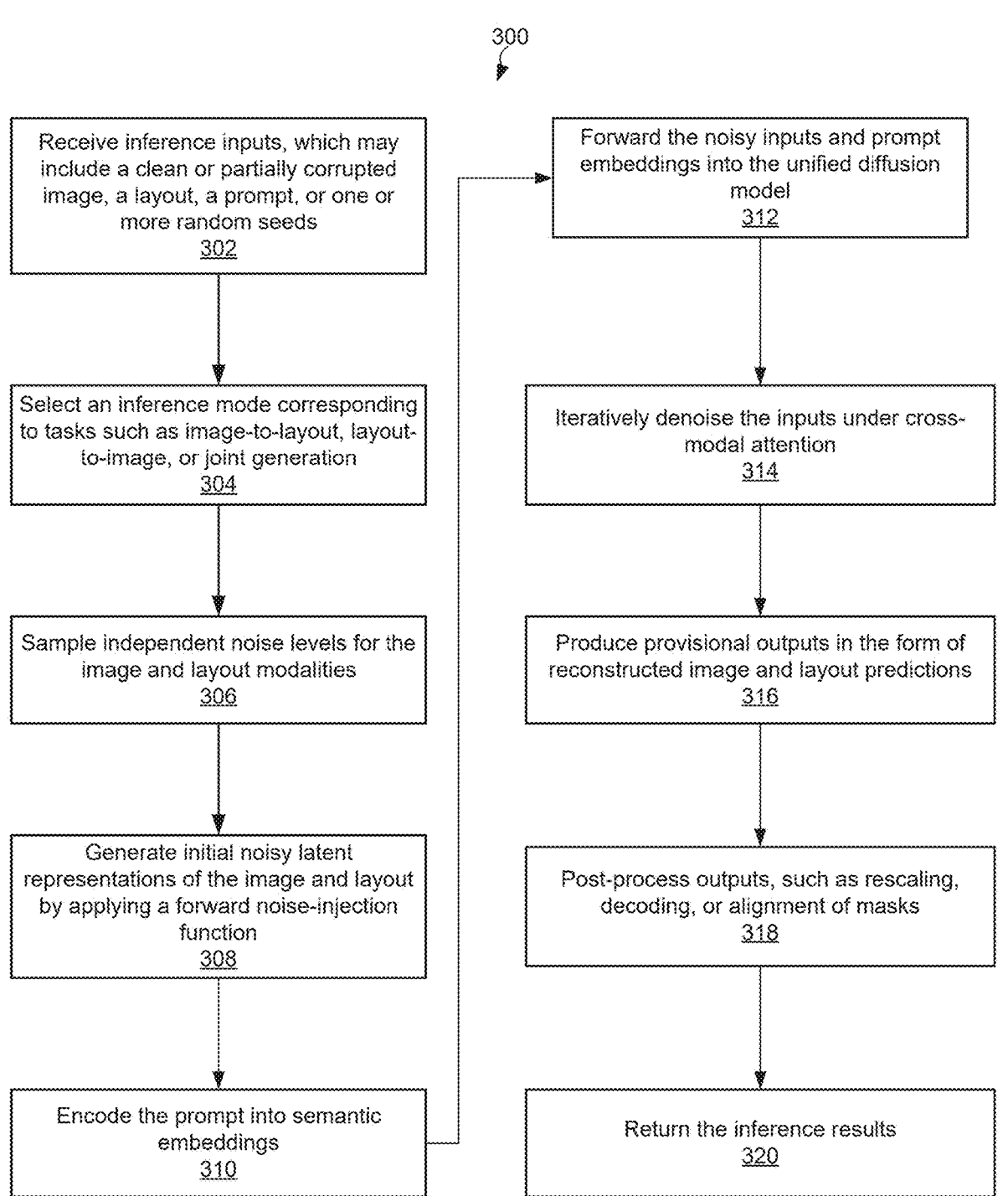

300

Receive inference inputs, which may include a clean or partially corrupted image, a layout, a prompt, or one or more random seeds
302

Select an inference mode corresponding to tasks such as image-to-layout, layout-to-image, or joint generation
304

Sample independent noise levels for the image and layout modalities
306

Generate initial noisy latent representations of the image and layout by applying a forward noise-injection function
308

Encode the prompt into semantic embeddings
310

Forward the noisy inputs and prompt embeddings into the unified diffusion model
312

Iteratively denoise the inputs under cross-modal attention
314

Produce provisional outputs in the form of reconstructed image and layout predictions
316

Post-process outputs, such as rescaling, decoding, or alignment of masks
318

Return the inference results
320

FIG. 3

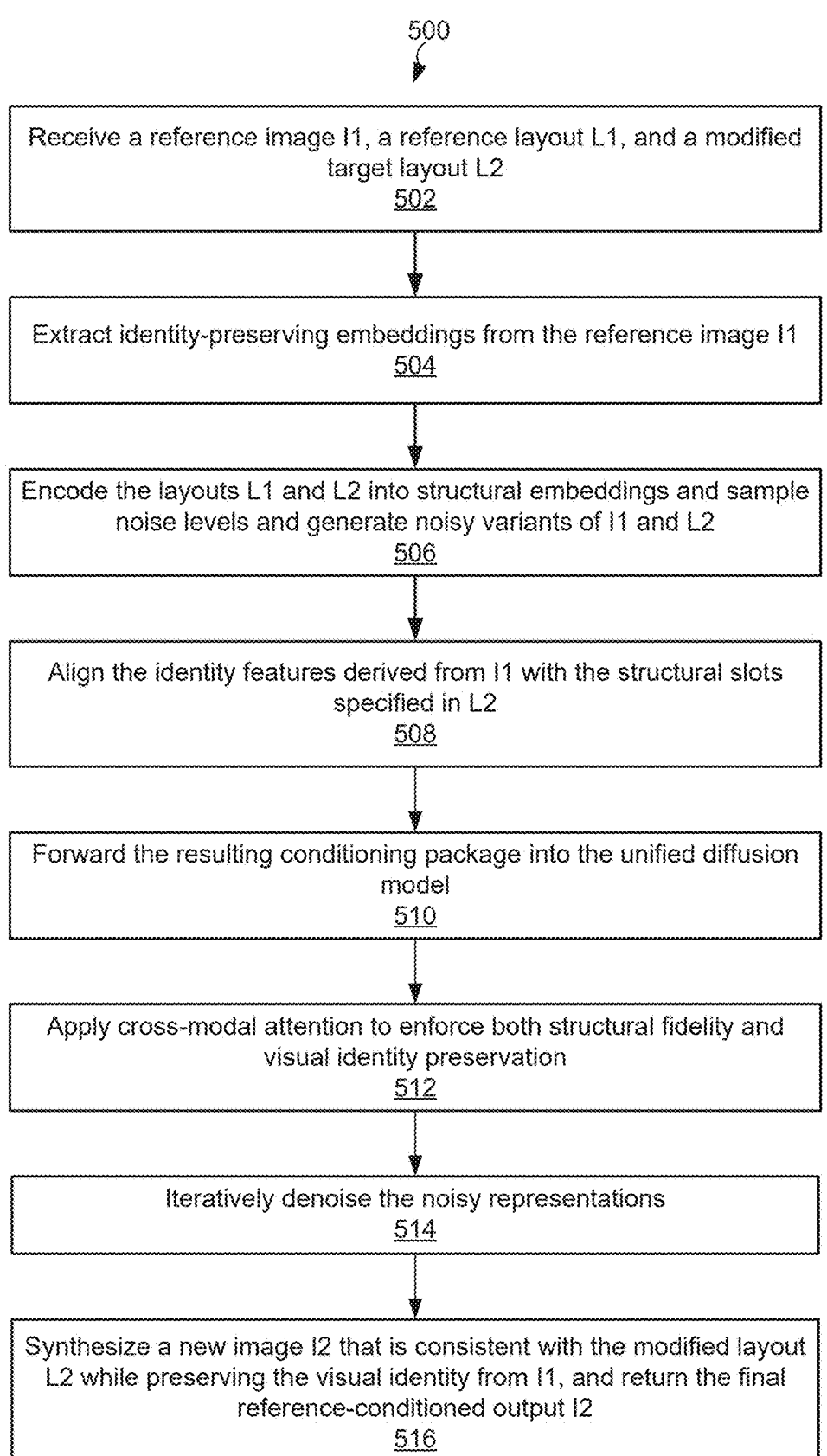

500

Receive a reference image I1, a reference layout L1, and a modified target layout L2
502

Extract identity-preserving embeddings from the reference image I1
504

Encode the layouts L1 and L2 into structural embeddings and sample noise levels and generate noisy variants of I1 and L2
506

Align the identity features derived from I1 with the structural slots specified in L2
508

Forward the resulting conditioning package into the unified diffusion model
510

Apply cross-modal attention to enforce both structural fidelity and visual identity preservation
512

Iteratively denoise the noisy representations
514

Synthesize a new image I2 that is consistent with the modified layout L2 while preserving the visual identity from I1, and return the final reference-conditioned output I2
516

*FIG. 5*

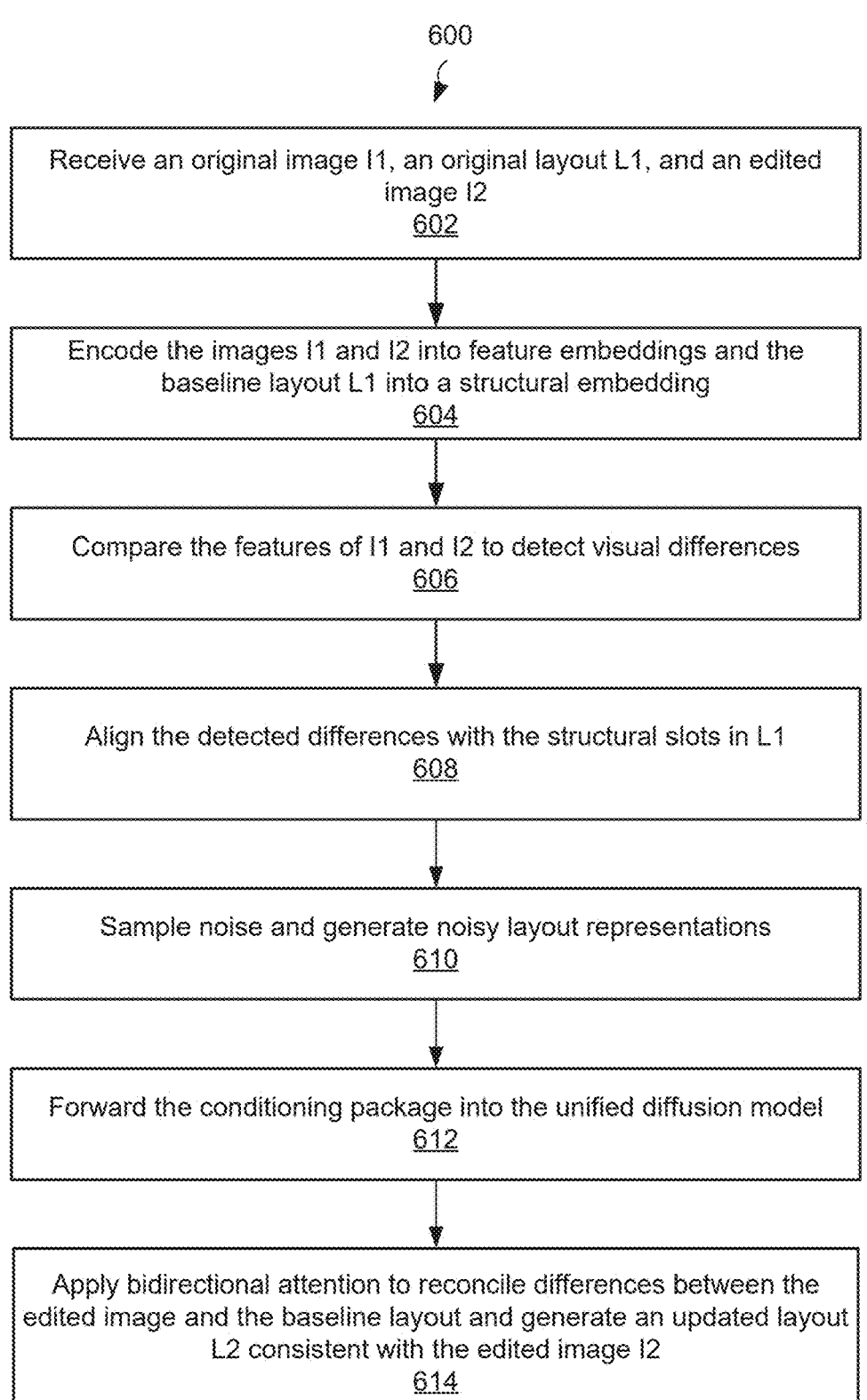

600

Receive an original image I1, an original layout L1, and an edited image I2
602

Encode the images I1 and I2 into feature embeddings and the baseline layout L1 into a structural embedding
604

Compare the features of I1 and I2 to detect visual differences
606

Align the detected differences with the structural slots in L1
608

Sample noise and generate noisy layout representations
610

Forward the conditioning package into the unified diffusion model
612

Apply bidirectional attention to reconcile differences between the edited image and the baseline layout and generate an updated layout L2 consistent with the edited image I2
614

*FIG. 6*

UNIFIED DIFFUSION MODEL FOR IMAGE GENERATION AND/OR EDITING

BACKGROUND

Image diffusion models frequently incorporate large language models (LLMs) as a mechanism for guiding the generation process. These LLMs operate in an autoregressive manner, meaning they produce one token at a time in a sequential order, with each token dependent on the previously generated ones. In the context of image generation, this token-by-token decoding is used to describe or condition aspects of the image, such as object placement, attributes, or relationships. While this stepwise approach allows for fine-grained control and coherent textual conditioning, it inherently introduces latency because every element of the output must be computed sequentially rather than in parallel. As a result, generating complex scenes with many diverse objects and interactions can become computationally expensive and time-consuming.

SUMMARY

The disclosure relates to jointly modeling the distribution of images and scene layouts through a unified diffusion model for image generation and/or editing. A unified diffusion model is an improved generative diffusion model that accesses image-layout-prompt triplets, applies independent corruption to each modality through an image sampler and a layout sampler that select noise levels from respective predefined distributions, and perturbs each modality by progressively blending clean data with random noise. The unified diffusion model denoises both modalities in tandem under a unified training objective, using a configurable weighting factor to balance image fidelity against layout fidelity, with bidirectional cross-modal attention and iterative optimization to reduce reconstruction error across both modalities simultaneously.

In particular, the unified diffusion model may be improved through independent scheduling of noise levels to expose the model to diverse training conditions, including a nearly clean image paired with a heavily corrupted layout, a heavily corrupted image paired with a nearly clean layout, or both modalities partially corrupted. In doing so, the model may learn to rely on the less corrupted modality as context while denoising the more corrupted one. By consolidating these tasks into a single training objective and a single model, the invention provides a unified framework for multimodal generation and inference. The disclosed system reduces latency compared to token-by-token language models, ensures bidirectional consistency between image and layout outputs, and eliminates the need for separate training data pipelines for each task. As a result, the system offers improved scalability, efficiency, and generalization in multimodal generative modeling.

A system may encode prompts into conditioning embeddings, assemble multimodal input packages with noise levels and task identifiers, and iteratively denoise to reconstruct images and layouts, with post-processing steps such as rescaling, decoding, or alignment of masks.

At inference, a system may repurpose the same trained model by adjusting relative noise levels to perform different tasks. These include image-to-layout prediction, layout-to-image generation, or joint synthesis of both image and layout. A system may generate a layout from a text prompt by heavily corrupting the layout input while leaving the image unaltered, jointly synthesize image and layout by corrupting both, infer a layout from an image by preserving the image while corrupting the layout, or edit an existing layout or image by selectively injecting noise and conditioning denoising on editing tokens. Multi-turn generation and editing may also be supported, allowing iterative refinement across user interactions while maintaining consistency.

A system may implement instruction-based editing by receiving an initial image, a corresponding layout, and an editing instruction, encoding the instruction into conditioning embeddings aligned with structural slots in the layout, sampling noise for both modalities, and jointly denoising to produce a new image and layout that reflect the requested modification. A system may implement layout-to-image generation with global reference conditioning by receiving a reference image, a reference layout, and a modified target layout, extracting identity-preserving embeddings from the reference image, aligning those embeddings with structural slots in the modified layout, and synthesizing an image that adheres to the new layout while preserving visual identity from the reference. A system may also implement layout-change inference by receiving an original image, a baseline layout, and an edited image, comparing features to detect differences, aligning the deltas with structural slots, and iteratively denoising to generate an updated layout consistent with the edited image.

BRIEF DESCRIPTION OF THE DRAWINGS

Features of the present disclosure may be illustrated by way of example and not limited in the following figure(s), in which like numerals indicate like elements.

FIG. 3 is a flow diagram illustrating an example method for performing general inference with a unified diffusion model, according to an implementation.

FIG. 5 is a flow diagram illustrating an example method for performing layout-to-image inference with global reference conditioning, according to an implementation.

FIG. 6 is a flow diagram illustrating an example method for performing layout-change inference, according to an implementation.

DETAILED DESCRIPTION

Figure 1:
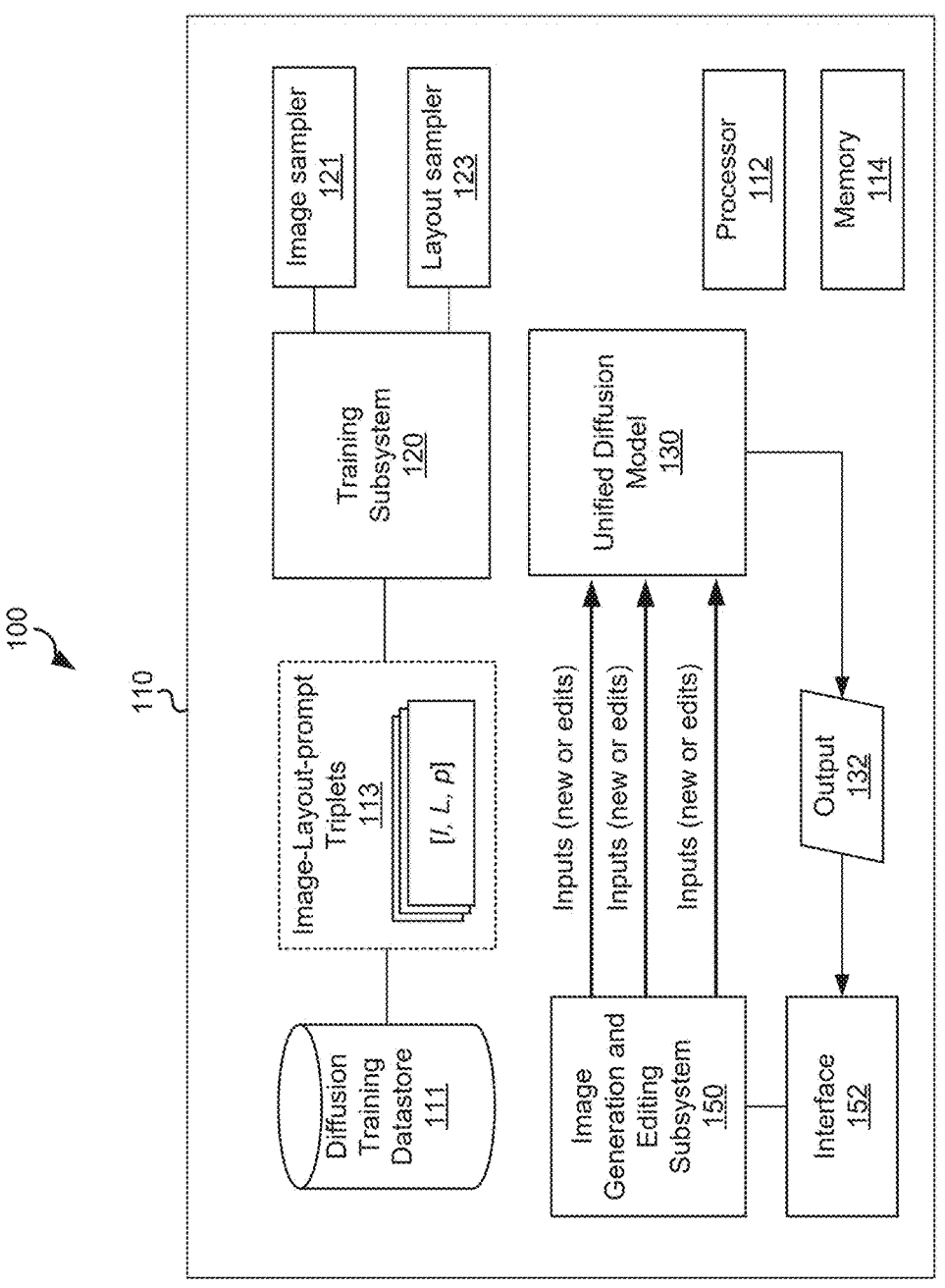
FIG. 1 illustrates an example of a system environment for image generation and/or editing based on a unified diffusion model for both image and layout generation, according to an implementation.

FIG. 1 illustrates an example of a system environment 100 for image generation and/or editing based on a unified diffusion model 130 for both image and layout generation, according to an implementation. In some examples, the unified diffusion model 130 may support multi-turn image generation and/or editing. "Multi-turn" refers to iterative refinement of images through successive user interactions. Rather than requiring a complete re-generation of an image for each modification, the system may incorporate prior outputs as context for subsequent turns. For example, a user may initially request the generation of an image of a "cat sitting on a hill," and then in a later turn specify that the cat should be brown, followed by another instruction to replace the sofa with a chair. In multi-turn implementations, each turn leverages the previously generated image and conditioning information, allowing the unified diffusion model 130 to maintain visual consistency across edits while progressively adapting the scene to the evolving instructions. This multi-turn process effectively simulates a conversational workflow with the system, providing a more natural and efficient mechanism for image creation and refinement.

The system environment 100 may include a computer system 110. The computer system 110 may include a training subsystem 120 that trains a unified diffusion model 130, an image generation and editing subsystem 150, and/or other features.

The training subsystem 120 may access training data, such as from the diffusion training datastore 111. The training data may include image-layout-prompt triplets 113. An image-layout-prompt triplet 113 may include an image I, a layout L, and a prompt p. An image I is a clean image representation in pixels or latent features. A layout L is a structured layout representation of the image I, such as bounding boxes, masks, keypoints, identity embeddings, and/or other layout representation. A prompt p is an input specification that guides the image generation and/or editing process. A prompt may include words or phrases, such as natural language text, describing desired content, attributes, or styles. Together, an image I, a layout L, and a prompt p may form an individual image-layout-prompt triplet 113.

In some examples, an image/from an image-layout-prompt triplet 113 may be stored in raster format with pixel values normalized to a canonical color space (for example, RGB with values in the range [0,1] or [−1,1]) and a fixed resolution (for example, 256×256 pixels). In other examples, the image/may be transformed into a latent representation via a learned encoder prior to training so that denoising operates in a lower-dimensional feature space rather than raw pixel space. In some examples, the image/may encode all some or all visual details of the scene, including object appearances, textures, lighting, and background context. In some examples, the image/may serve as the ground-truth reconstruction target for training.

In some examples, a layout L from an image-layout-prompt triplet 113 may capture spatial structure and semantic organization of the scene of the image I of the image-layout-prompt triplet 113. For example, the layout L may include a structured representation of the scene encoded in the image/from the image-layout-prompt triplet 113. In some examples, the layout L may include two-dimensional bounding boxes for objects, specified by normalized corner coordinates $(x_{min}, y_{min}, x_{max}, y_{max})$ relative to the image dimensions, together with categorical labels and optional attributes (for example, color, pose, or action). In other examples, the layout L may include a segmentation mask. In these examples, each pixel or super-pixel may be assigned an object identity or semantic class. In some examples, the layout L may include sparse keypoints or skeletal structures for articulated objects, or identity embeddings derived from a reference model to track specific instances across frames. In some examples, layout L may serve as the ground-truth reconstruction target for the structural modality during denoising.

In some examples, a prompt p from an image-layout-prompt triplet 113 may include a textual description associated with the image/and/or the layout L in the image-layout-prompt triplet 113. In some examples, the prompt p may include natural-language text, such as a sentence or sequence of tokens describing the objects, attributes, and/or relationships present in the scene (such as "a cat sitting on a hill"). In some examples, the prompt p may include additional editing instructions, style constraints, or negative guidance tokens. The prompt p may be processed through a text encoder in the prompt and context conditioning subsystem to yield embedding vectors that condition the denoising process across both the image and layout modalities. The prompt p may anchor the generative process semantically, ensuring that reconstructions or generated samples remain aligned with linguistic descriptions and editing instructions.

The training subsystem 120 may train a unified diffusion model 130 based on the image-layout-prompt triplets 113. In particular, the training subsystem 120 may train a diffusion model D to jointly denoise the image and layout, conditioned on the prompt, as expressed in Equation 1:

$$I^*, L^* = D(p) \tag{1}$$

The unified training objective may be expressed as Equation 2:

$$\min \|I^* - I\| + w^* \|L^* - L\| \tag{2}$$

in which:

I* may represent the image predicted or reconstructed by the unified diffusion model 130 after receiving a corrupted version of the ground-truth image/together with conditioning signals;

I may represent the clean ground-truth image drawn from an image-layout-prompt triplet 113;

$\|I^* - I\|$ may denote a distance function, such as an L2 norm or perceptual similarity metric, that quantifies the discrepancy between the predicted image and the ground-truth image;

L* may represent the layout predicted or reconstructed by the unified diffusion model 130 after receiving a corrupted version of the ground-truth layout L together with conditioning signals;

L may represent the clean ground-truth layout corresponding to the same training example;

$\|L^* - L\|$ may denote a distance function, such as an L1 or L2 norm over bounding box coordinates, segmentation mask pixels, or embedding vectors, that quantifies the discrepancy between the predicted layout and the ground-truth layout; and w may represent a scalar weighting factor applied to the layout error term, allowing the system designer to adjust the relative contribution of image fidelity versus layout fidelity during training. For example, a larger w may emphasize precise structural reconstruction, while a smaller w may emphasize high-quality visual reconstruction.

The minimization operator (min) in Equation 2 illustrates that the unified diffusion model 130 may be trained through an optimization procedure (for example, stochastic gradient descent, Adam, or a related optimizer). At each training step, the reconstruction objective min $\|I^* - I\| + w^* \|L^* - L\|$ may be computed on noisy input pairs drawn from the training triplets. Gradients of this objective may then be propagated backward through the unified diffusion model 130 and the training subsystem 120. Parameter values of the unified diffusion model 130 may be updated iteratively to reduce the objective.

Over many iterations across the entire corpus of image-layout-prompt triplets 113, the minimization operator may therefore indicate that the system as a whole is driven toward parameter settings that reduce both image reconstruction error and layout reconstruction error simultaneously.

The unified loss function may allow a single model to be trained across multiple task conditions without needing task-specific objectives. Because both image and layout are always present as reconstruction targets, and because the relative corruption levels for I and L may vary independently across training samples, the same objective may guide the system to learn: how to recover layouts from clean images, how to recover images from clean layouts, and how to recover both modalities jointly when both are corrupted.

Independently Sampled Image and Layout Noise and Unified Loss Optimization

The training subsystem 120 may implement independent modality-specific corruption during training based on an image sampler 121 and a layout sampler 123. The image sampler 121 may receive a noise level parameter, $t_{image}$. In some examples, the noise level parameter $t_{image}$ may be drawn from a first predefined noise distribution. Similarly, the layout sampler 123 may receive a noise level parameter $t_{layout}$. In some examples, the noise level parameter $t_{layout}$ may be drawn from a second predefined noise distribution.

The term "predefined noise distribution" refers to a probability distribution established in advance of training and defined over a normalized interval, such as [0,1]. Examples of predefined noise distributions may include: (1) a uniform distribution that samples all noise levels equally; (2) Beta distributions that may be skewed toward low (or no) noise values, skewed toward higher noise values, or concentrated at intermediate values; (3) Gaussian distributions truncated to [0,1] that concentrate sampling near a specified mean; (4) exponential or reverse-exponential distributions that favor extremely low or extremely high noise values, respectively; and (5) piecewise or manually weighted distributions that emphasize certain subranges of [0,1]. In some examples, a predefined noise distribution may include a deterministic schedule, such as a linear or cosine progression, that ensures systematic coverage of the interval [0,1]. By selecting distinct predefined distributions for the image modality and the layout modality, the training subsystem 120 may bias the corruption difficulty differently across modalities, thereby improving robustness and task generalization.

Noise Injection

The forward noise-injection function F defines a corruption path that the training subsystem 120 may apply to any continuous representation x, and the unified diffusion model 130 may learn to invert that corruption during denoising. In this formulation, x denotes a modality vector or tensor with a fixed shape; for the image channel, x may be the image in pixel space or in a learned latent space, and for the layout channel, x may be a continuous encoding of structure such as concatenated bounding-box coordinates, a dense segmentation mask projected into a feature space, keypoint coordinates, or an identity embedding. The scalar t denotes a noise level selected within the normalized interval [0, 1]; the training subsystem 120, through the image sampler 121 and the layout sampler 123, may draw t independently for each modality from predefined noise-level distributions so that the image channel and the layout channel experience different corruption severities during the same training step. The tensor z denotes a random draw from a standard normal distribution N(0, 1) with the same shape as x; in practice, this means that each component of z is sampled independently with zero mean and unit variance, and separate draws may be used for different modalities and different training examples.

Under flow matching, the training subsystem 120 may realize the forward trajectory by computing $F(x, t)=(1-t) \cdot x + t \cdot z$. This operation is a convex interpolation between the clean sample x and an independent Gaussian sample z. When t is near 0, F returns a nearly clean version of x with a small perturbation; when t is near 1, F approaches pure Gaussian noise that is statistically independent of x; when t is in the interior of [0, 1], F produces a partially corrupted point that lies on the straight line segment connecting x to z in the ambient space. Because z has zero mean and unit variance and because the interpolation weights sum to one, F(x, t) preserves a simple signal-to-noise interpretation: the contribution of the data decreases linearly with t while the contribution of noise increases linearly with t, which makes the corruption severity easy to schedule and analyze. The straight-line path specified by F is the probability path that flow matching typically follows during training; the unified diffusion model 130 may be trained to predict the reverse direction along this path (or, equivalently, to reconstruct x from F(x, t)) given knowledge of t and appropriate conditioning.

In the multimodal setting, the training subsystem 120 may apply F independently to the image representation and to the layout representation as $F(I, t_{image})$ and $F(L, t_{layout})$. The variables $t_{image}$ and $t_{layout}$ may be sampled independently from distinct predefined distributions over [0, 1], and the Gaussian draws z for the two modalities may likewise be independent with shapes matched to their respective representations. This independence may cause the unified diffusion model 130 to encounter diverse training conditions (such as a nearly clean image paired with a heavily corrupted layout, a heavily corrupted image paired with a nearly clean layout, or both modalities partially corrupted) while the ground-truth targets remain the original clean I and L. During optimization, the unified diffusion model 130 may learn to use the less corrupted modality as context while denoising the more corrupted modality, and may learn to reconstruct both when both are corrupted, under a single unified training objective.

In some examples, the noise levels $t_{image}$ and $t_{layout}$ may be sampled from a predefined noise distribution independently of one another. In these examples, the first predefined noise distribution may be the same or (more likely) different than the second predefined noise distribution. In this way, the training subsystem 120 may expose modeling to diverse combinations of corruption across modalities. This independent sampling may allow a single trained model (the unified diffusion model 130) to generalize across a variety of downstream tasks by adjusting noise levels during inference.

Noise Adjustment for Image to Layout $t_{image} \approx$ (approximately equal to) 0, $t_{layout} \in [0, 1]$ When the image sampler 121 applies little or no noise such that $t_{image}$ is approximately 0 and the layout sampler 123 applies noise values across its full range between 0 and 1, the unified diffusion model 130 may learn to reconstruct a clean layout conditioned on a nearly clean image. This training condition may resemble layout extraction tasks typically handled by vision-language models, but achieved here without requiring a separate specialized model. When $t_{image}$ is "approximately equal to" 0 or 1, there may be a tolerance in the range of about 0.01-0.05.

Noise Adjustment for Joint Generation $t_{image} \in [0, 1]$, $t_{layout} \in [0, 1]$ When the image sampler 121 and the layout sampler 123 both apply noise levels within their ranges between 0 and 1, the unified diffusion model 130 may learn to simultaneously reconstruct the image and the layout under the guidance of the text prompt. This training condition may enable the unified diffusion model 130 to jointly generate realistic images together with interpretable and editable intermediate layout representations.

Noise adjustment for Layout to Image $t_{image} \in [0, 1]$, $t_{layout} \approx 0$ When the image sampler 121 applies noise levels within its range between 0 and 1, and the layout sampler 123 applies little or no noise such that $t_{layout}$ is approximately 0, the unified diffusion model 130 may learn to generate images conditioned on clean layouts, similar to standard layout-to-image generation pipelines. In some examples, during inference the training subsystem 120 may set $t_{layout}$ to a small value slightly greater than zero, thereby improving robustness to minor inaccuracies present in layout inputs.

Furthermore, because the training subsystem 120 may implement independent sampling of $t_{image}$ and $t_{layout}$ based respectively on the image sampler 121 and the layout sampler 123, the disclosed training framework may naturally extend to multiple [I, L] scenarios. In these instances, additional images and layouts may be incorporated as context into the denoising process, allowing the unified diffusion model 130 to perform multi-turn editing, reasoning, and consistency preservation across sequences of related inputs.

Inference-Based Image Generation and/or Editing

The image generation and editing subsystem 150 may access one or more inputs for generating and/or editing images using the unified diffusion model 130. For example, the image generation and editing subsystem 150 may execute the unified diffusion model 130 with the one or more inputs to the unified diffusion model 130. Because the unified diffusion model 130 was trained on independently sampled image and layout noise while using a unified loss optimization, the unified diffusion model 130 may provide different outputs, such as generating a new image and/or editing an existing image, which may be a multi-turn generation. In some examples, the image generation and editing subsystem 150 may receive the inputs and/or provide generated outputs via an interface 152.

Instruction-Based Editing

Given an initial image I1, layout L1 and an editing instruction e, the unified diffusion model 130 may generate a new image I2 and L2 that reflect the result of applying the instruction to the original scene.

In some examples, the image generation and editing subsystem 150 may operate in an instruction-based editing mode. In this configuration, the input may include an initial image I1, a corresponding layout L1 that structurally encodes the scene, and an editing instruction e. The editing instruction e may be expressed as a natural language string, a structured token sequence, or another symbolic representation, and may specify scene modifications such as "remove the red chair," "add a lamp on the desk," or "move the window to the left wall." The purpose of the instruction-based editing mode is to apply the semantic intent of the instruction e to both the image and layout modalities, thereby producing a new image I2 and a new layout L2 that remain mutually consistent.

To achieve this functionality, the image generation and editing subsystem 150 may first encode the instruction e through the training subsystem 120. This subsystem may tokenize the natural-language instruction and transform it into conditioning embeddings that can be interpreted by the unified diffusion model 130. Simultaneously, the image generation and editing subsystem 150 may provide noisy versions of the image I1 and the layout L1, generated by the image sampler 121 and the layout sampler 123, along with the encoded instruction embeddings. By perturbing the inputs, the system forces the model to reconstruct clean outputs consistent with the editing intent.

The image generation and editing subsystem 150 may align the instruction embeddings with structural slots in the layout representation, ensuring that edits are targeted to the correct scene elements. For example, if the instruction specifies removal of the "second chair," the embedding may be linked to the bounding box in L1 corresponding to the second chair instance. If the instruction specifies "add a lamp on the desk," the image generation and editing subsystem 150 may create a new slot in the structural embedding to represent the lamp, associated with the location of the desk in the layout. This alignment of instruction tokens with structural tokens may be passed as part of the conditioning package to the unified diffusion model 130.

The unified diffusion model 130 may then execute a joint denoising process. Using its bidirectional attention mechanism, the unified diffusion model 130 may refine both modalities simultaneously, applying the editing instruction e consistently across the image and layout channels. Layout cues may guide the placement and attributes of edits in the image, while visual cues may help refine or validate the modified structure in the layout. After iterative denoising, the unified diffusion model 130 may output a new image I2 that visually reflects the requested edit and a new layout L2 that structurally encodes the same modification.

To illustrate, when the input I1 and L1 represent a living room scene with two chairs and the editing instruction e specifies "remove the red chair," the unified diffusion model 130 may produce an updated image I2 in which the red chair has been removed, while the updated layout L2 omits the bounding box or segmentation mask corresponding to the removed chair. When the instruction e specifies "add a lamp on the desk," the unified diffusion model 130 may synthesize an updated image I2 showing the lamp placed on the desk, while the updated layout L2 includes a new annotation for the lamp object.

This instruction-based editing process may ensure that both modalities evolve in parallel under explicit semantic control, such that I2 and L2 remain synchronized. The mechanism provides interpretability and editability through the layout representation, while allowing intuitive natural-language control through the instruction e. Accordingly, the instruction-based editing mode of the image generation and editing subsystem 150 enables the unified diffusion model 130 to apply edits that are semantically meaningful, visually coherent, and structurally consistent across multimodal representations.

Inference: Layout to Image with Global Reference

In some examples, the image generation and editing subsystem 150 may operate in a layout-to-image generation with global reference mode. In this configuration, the input provided to the unified diffusion model 130 may include a reference image I1, a corresponding layout L1, and a modified target layout L2. The reference image I1 may depict one or more entities whose visual identity is to be preserved during editing, such as a particular person, pet, product, or other object with distinguishing visual features. The layout L1 may encode structural annotations of that image, such as bounding boxes, segmentation masks, or skeletal keypoints. The modified layout L2 may specify a new target structural arrangement that alters the placement or attributes of objects in the scene, for example moving objects, introducing new elements, or changing their spatial relationships. The unified diffusion model 130 may synthesize a new image I2 that adheres to the structure of L2 while preserving visual identity from I1. This promotes coherence across edits and supports identity-aware generation.

In some examples, to achieve this and other functionality associated with model inference, the image generation and editing subsystem 150 may orchestrate preprocessing prior to invoking the unified diffusion model 130. The image generation and editing subsystem 150 may interface with encoders to extract identity-preserving embeddings from the reference image I1, to tokenize the reference layout L1, and to encode the modified layout L2 into a structural representation. The image generation and editing subsystem 150 may then align these embeddings so that identity information from I1 is associated with spatial slots defined by L2. Once this alignment is complete, the image generation and editing subsystem 150 may provide the resulting conditioning signals, along with appropriately noised inputs, to the unified diffusion model 130. The unified diffusion model 130 may then perform the denoising process to synthesize the new image I2 in accordance with the structural constraints of L2 and the visual identity information derived from I1.

In particular, the image generation and editing subsystem 150 may first process the reference image I1 through an encoder to derive identity-preserving feature embeddings. These embeddings may capture low-level attributes such as texture, color, and shape, as well as higher-level semantic features such as facial embeddings, style vectors, or object descriptors. The reference layout L1 may be tokenized into a structural embedding that describes categories, coordinates, or mask information. The modified layout L2 may be encoded into a comparable structural representation that describes the target arrangement. The image generation and editing subsystem 150 may then align the embeddings derived from I1 with slots defined in L2 so that the visual identity of an entity can be mapped into its new structural location. For example, if L2 specifies that a person should appear in a new position, the person's identity embedding from I1 may be reassigned to the bounding box coordinates defined by L2.

Once these alignments are established, the image sampler 121 and the layout sampler 123 may independently apply corruption to I1 and L2 according to noise levels drawn from their respective predefined distributions. This produces noisy variants of the inputs that, together with the identity embeddings and any conditioning prompts, may be provided to the unified diffusion model 130. The unified diffusion model 130 may then apply bidirectional cross-modal attention mechanisms to denoise the corrupted image and layout representations iteratively. During this process, the layout information may guide the arrangement of content in the image while the image embeddings may refine structural interpretations, resulting in mutual reinforcement across modalities.

Through this coordinated operation, the unified diffusion model 130 may generate a new image I2 that adheres to the spatial specification of the modified layout L2 while retaining the appearance and identity of entities from the reference image I1. For instance, when I1 depicts a seated person and L2 specifies that the person should be standing, the generated image I2 may depict the same person now standing, preserving their facial features, clothing, and stylistic appearance. If L2 introduces an additional object, such as a lamp on a desk, the model may synthesize an image I2 that incorporates the lamp into the scene consistently while maintaining the identity of all pre-existing entities from I1.

This process ensures structural fidelity by conditioning generation on L2, visual identity preservation by extracting and aligning features from I1, and cross-modal coherence through bidirectional attention in the unified diffusion model 130. The approach may further generalize across editing workflows, since the corruption applied to I1 and L2 may vary independently. Accordingly, the layout-to-image generation with global reference mode of the image generation and editing subsystem 150 may produce outputs that are structurally faithful to updated layouts while remaining visually faithful to reference identities, thereby supporting coherence across sequential edits and enabling identity-aware generation Inference: Infer Layout Changes from a Pair of Images In some examples, the image generation and editing subsystem 150 may operate in a layout-change inference mode. In this configuration, the input may include an original image I1, a corresponding layout L1 that describes the structural arrangement of entities in the original scene, and an edited image I2 that reflects modifications to that scene. The edited image I2 may be the result of direct user edits, an external editing system, or generative modification performed in a prior pass. The purpose of the layout-change inference mode is to produce an updated layout L2 that captures the structural differences implied by the visual changes from I1 to I2. This functionality may be valuable for interpreting user intent and for maintaining consistency between visual representations and structural annotations across iterative editing workflows.

To achieve this functionality, the image generation and editing subsystem 150 may first process the original image I1 through a feature encoder to extract baseline embeddings that represent the visual and semantic content of the original scene. The layout L1 may be tokenized into a structural embedding that encodes object categories, spatial coordinates, segmentation masks, or identity embeddings. The edited image I2 may then be processed through a second encoder to extract embeddings that capture the modified visual state of the scene. The image generation and editing subsystem 150 may compare the embeddings from I1 and I2 in the context of the structural specification provided by L1. This comparative analysis may highlight regions of difference, such as newly added objects, removed objects, or changes in object position, scale, or attributes.

The image generation and editing subsystem 150 may then assemble a conditioning package that represents both the baseline structure of L1 and the deltas implied by I2. For example, if I2 shows that a chair present in I1 has been removed, the image generation and editing subsystem 150 may encode this removal as a negative constraint relative to the bounding box that represented the chair in L1. If I2 shows that a lamp has been added, image generation and editing subsystem 150 may generate a new structural slot to represent the lamp, initialized with category and approximate spatial placement derived from the visual features of I2. If I2 shows that an existing object has shifted position, the image generation and editing subsystem 150 may update the coordinates or segmentation mask tokens accordingly.

Once this alignment is complete, the image generation and editing subsystem 150 may provide the comparative embeddings and structural deltas to the unified diffusion model 130. The unified diffusion model 130 may apply cross-modal attention between the embeddings derived from I2 and the structural tokens from L1 to denoise a noisy structural representation into a clean updated layout L2. In this denoising process, the unified diffusion model 130 may refine the placement and attributes of objects in the updated layout so that L2 accurately reflects the scene depicted in the edited image I2 while preserving continuity with the baseline structure of L1.

For instance, if I1 and L1 describe a scene with two chairs at a table, and I2 shows the same table with only one chair remaining, the updated layout L2 may omit the bounding box corresponding to the removed chair. If I2 depicts an additional plant in the corner of the room, the updated layout L2 may introduce a new bounding box or segmentation mask for the plant. If I2 depicts the table moved slightly to the left, the updated layout L2 may adjust the coordinates of the bounding box representing the table accordingly.

This process may ensure that edits made visually are captured structurally, so that subsequent tasks, such as further editing, reasoning, or multimodal consistency checks, operate on an accurate representation of the scene. In this way, the layout-change inference mode enables the system to interpret user intent expressed through visual edits and to preserve alignment between images and layouts across iterative modification cycles.

The processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some implementations, processor 112 may comprise a plurality of processing units. These processing units may be physically located within the same device, or processor 112 may represent processing functionality of a plurality of devices operating in coordination. Some or all processing units may be on-site within a computational facility and/or be located remotely such as at a cloud-based computing facility. The memory 114 may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

Figure 2:
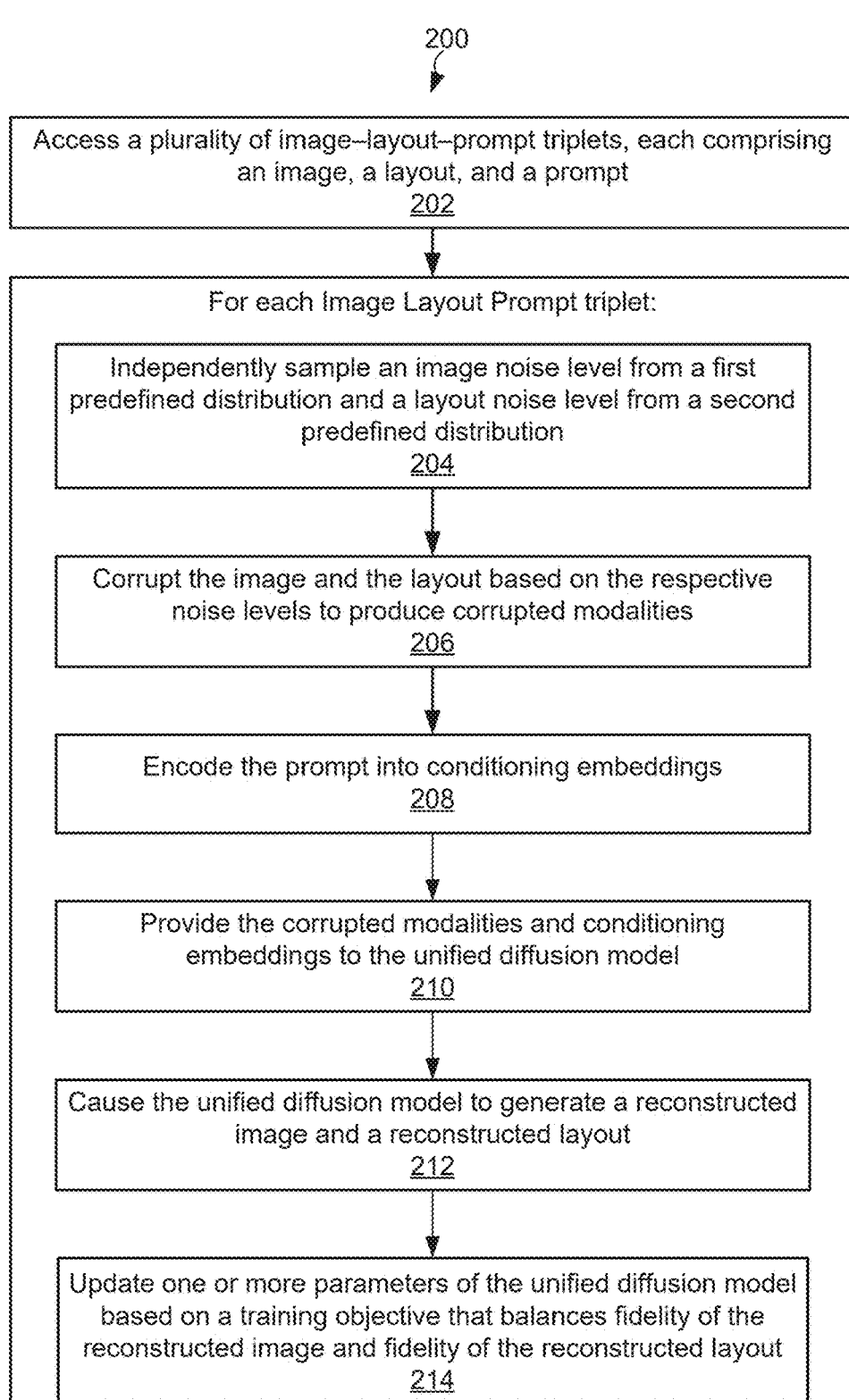
FIG. 2 is a flow diagram illustrating an example method for training a unified diffusion model, according to an implementation.

FIG. 2 is a flow diagram illustrating an example method 200 for training a unified diffusion model 130, according to an implementation.

At 202, the method 200 may include accessing a plurality of image-layout-prompt triplets 113, each image-layout-prompt triplet 113 comprising an image, a layout, and a prompt, for example, the training subsystem 120 may perform this operation.

At 204, the method 200 may include independently sampling an image noise level from a first predefined distribution and a layout noise level from a second predefined distribution, for example, the image sampler 121 and the layout sampler 123 may perform this operation. In some examples, the first predefined distribution may be selected to reflect statistical characteristics of images, such as pixel-level variability or latent-space entropy, while the second predefined distribution may be tailored to structural features of layouts, such as spatial sparsity or geometric consistency. The respective noise levels may be drawn from distributions defined over the unit interval [0,1], which may include uniform, beta, cosine, or other scheduling functions. In some examples, the system may further generate independent Gaussian noise draws matched in dimensionality to the image and layout modalities, ensuring that the corruption process remains modality-specific while still conforming to the unified diffusion training framework. By decoupling the sampling of $t_{image}$ and $t_{layout}$, the method may allow the system to present the unified diffusion model 130 with heterogeneous difficulty conditions, such as scenarios where the image is nearly clean but the layout is heavily corrupted, or vice versa. This independent scheduling enables the system to train the model to handle cross-modal asymmetries, improving its ability to generalize to diverse inference settings, including joint co-generation, layout-to-image synthesis, image-to-layout prediction, and instruction-driven editing.

At 206, the method 200 may include corrupting the image and the layout based on the respective noise levels to produce corrupted modalities, for example, the training subsystem 120 may perform this operation. In some examples, corruption may be applied using a forward noise-injection function defined as $F(x, t)=(1-t)*x+t*z$, where x represents the clean modality input (e.g., image or layout), t denotes the sampled noise level, and z corresponds to a Gaussian noise draw sampled from N(0,1). This formulation produces a continuous interpolation between the original modality and pure Gaussian noise, with the degree of corruption governed by the magnitude of t.

In some examples, corrupting the image channel may involve injecting pixel-level or latent-space noise into visual representations such as RGB images, feature maps, or encoded latent vectors. Similarly, corrupting the layout channel may involve perturbing structural tensors such as bounding boxes, segmentation masks, spatial grids, or embedding matrices, ensuring that both visual and spatial modalities are exposed to difficulty-controlled degradation. By applying noise separately to each modality, the system may create training conditions where one modality is preserved more faithfully than the other, thereby encouraging the unified diffusion model 130 to exploit cross-modal information during reconstruction.

In some examples, the corruption operation may be configured to support diverse training schedules. For instance, linear, cosine, or beta-shaped schedules may be used to gradually increase corruption severity over training epochs, while randomized schedules may be used to ensure robustness across heterogeneous corruption profiles. This flexibility allows the system to generate corrupted modalities that represent a spectrum of training scenarios, ranging from nearly unaltered representations to heavily degraded inputs, thereby strengthening the capacity of the unified diffusion model 130 to perform reliable joint denoising across varying difficulty levels.

At 208, the method 200 may include encoding the prompt into conditioning embeddings, for example, the training subsystem 120 may perform this operation. In some examples, the prompt may comprise natural language text, symbolic tags, or multi-turn dialog instructions that describe desired attributes, spatial configurations, or semantic content for the output modalities. The training subsystem 120 may tokenize the prompt into discrete text tokens, apply subword or character-level segmentation as appropriate, and map these tokens into continuous embedding vectors using an encoder model such as a transformer, recurrent network, or pretrained language representation.

In some examples, the conditioning embeddings may further capture higher-order contextual semantics. For instance, the training subsystem 120 may leverage a large language model (LLM) to normalize synonyms, disambiguate polysemous terms, and expand terse inputs into richer contextual cues. The embeddings may be designed to align with the representation space of the unified diffusion model 130, ensuring compatibility with attention layers that integrate text features with corrupted image and layout modalities.

In further examples, the training subsystem 120 may augment the conditioning embeddings with auxiliary information such as metadata tags, task identifiers, or positional encodings. For instance, metadata may include difficulty indicators tied to the independently sampled noise levels, while task identifiers may specify whether the training objective involves joint reconstruction, layout-to-image synthesis, or instruction-based editing. This enrichment allows the conditioning embeddings to serve not only as semantic guidance but also as control signals that steer the denoising process in the unified diffusion model 130.

In some implementations, the training subsystem 120 may apply dimensionality reduction or projection operations to ensure that the conditioning embeddings remain computationally efficient while still retaining sufficient semantic expressiveness. This step enables the conditioning embeddings to function as a compact yet informative representation, facilitating robust integration into the multimodal denoising pipeline.

At 210, the method 200 may include providing the corrupted modalities and conditioning embeddings to the unified diffusion model, for example, the unified diffusion model 130 may perform this operation. In some examples, the corrupted image representation, the corrupted layout representation, and the prompt conditioning embeddings may be assembled into a multimodal input package. This package may further include metadata such as noise levels, task identifiers, or modality-specific masks that inform the model of the corruption severity and the target reconstruction objectives.

In some examples, the unified diffusion model 130 may be configured with shared parameters and a bidirectional cross-modal attention mechanism that enables simultaneous processing of the corrupted image and layout modalities under semantic guidance from the conditioning embeddings. The multimodal inputs may be routed into parallel encoding pathways, where early fusion layers preserve modality-specific features while cross-attention layers allow information to flow between modalities. For instance, structural cues from the corrupted layout may guide the spatial arrangement of objects in the reconstructed image, while visual features from the corrupted image may inform semantic refinements in the reconstructed layout.

In some examples, the conditioning embeddings derived from the prompt may act as an external guide, anchoring both visual and structural modalities to the intended semantic meaning. During this stage, the unified diffusion model 130 may apply iterative denoising steps, progressively refining the corrupted inputs into intermediate representations that converge toward the target clean modalities. By tightly integrating corrupted modalities with textual guidance, the system may ensure that reconstructions remain semantically aligned with the prompt while preserving coherence between the visual and layout domains.

In some implementations, the unified diffusion model 130 may further apply normalization or gating mechanisms to balance contributions from each modality. For instance, attention weights may be dynamically scaled to emphasize image cues when layout corruption is severe, or layout cues when image corruption dominates. This adaptive integration improves robustness across asymmetric corruption scenarios and supports flexible training objectives such as image-to-layout, layout-to-image, joint generation, or editing tasks.

At 212, the method 200 may include causing the unified diffusion model to generate a reconstructed image and a reconstructed layout, for example, the unified diffusion model 130 may perform this operation. In some examples, the unified diffusion model 130 may operate in an iterative denoising framework, wherein corrupted inputs are progressively refined over a sequence of timesteps. At each iteration, the model may predict a less noisy approximation of the target modalities, guided jointly by the conditioning embeddings derived from the prompt and by cross-modal attention between the image and layout channels.

In some examples, the generation of the reconstructed image I* and reconstructed layout L* may leverage a shared parameterization that ensures consistency between the two modalities. Unlike conventional independent pipelines, the unified diffusion model 130 may employ bidirectional cross-modal attention layers, which allow semantic features in the prompt to anchor both channels while enabling information flow between them. For instance, structural cues present in the layout modality may enforce object positioning and spatial arrangement in the image modality, while textural and semantic details in the image modality may refine object categories or attributes in the layout modality.

In further examples, the model may implement modality-specific decoders at later stages to render outputs in their native formats, such as pixel arrays or latent image embeddings for I*, and spatial tensors, masks, or embedding grids for L*. These outputs may remain closely aligned because they originate from a unified latent representation that integrates cross-modal information throughout the denoising process.

In some implementations, the iterative reconstruction process may be probabilistic, allowing the model to sample diverse reconstructions that remain consistent with the training objective. This stochasticity may improve generalization and robustness, enabling the system to handle varied downstream tasks such as image-to-layout inference, layout-to-image synthesis, joint co-generation, and instruction-based editing. The reconstructed outputs I* and L* may then be evaluated against the ground-truth modalities to drive further parameter updates, ensuring that the unified diffusion model 130 progressively improves its ability to generate coherent and semantically faithful multimodal outputs.

At 214, the method 400 may include updating one or more parameters of the unified diffusion model based on a training objective that balances fidelity of the reconstructed image and fidelity of the reconstructed layout, for example, the unified optimization subsystem 140 may perform this operation.

In some examples, the training objective may be expressed as a unified reconstruction loss of the form as expressed in Equation 2. The objective may be computed using pixel-space, feature-space, or perceptual similarity metrics for the image channel, and structural alignment, mask overlap, or embedding distance measures for the layout channel.

In some examples, gradients of the unified objective may be backpropagated through the unified diffusion model 130, as well as through the prompt encoding pathways used to generate conditioning embeddings, thereby jointly adapting visual, structural, and semantic components of the system. The unified optimization subsystem 140 may apply optimization algorithms such as stochastic gradient descent, Adam, or variants thereof to update parameters, and may optionally maintain exponential moving averages of model weights to improve training stability and downstream inference performance.

In further examples, the weighting factor w may be dynamically adjusted during training, such that the system emphasizes layout fidelity in early training stages to enforce structural consistency, and progressively increases the emphasis on image fidelity to refine perceptual quality. This adaptive balancing enables the unified diffusion model 130 to co-optimize across both modalities, reducing the likelihood of overfitting to one channel while neglecting the other.

In some implementations, the unified optimization sub-system 140 may additionally log training metrics, monitor convergence trends, and implement early-stopping criteria if performance plateaus on validation sets. By continuously updating the parameters of the unified diffusion model 130 under a balanced multimodal training objective, the system progressively improves its ability to reconstruct semanti-cally accurate, visually coherent, and structurally consistent outputs across diverse training conditions.

FIG. 3 is a flow diagram illustrating an example method 300 for performing general inference with a unified diffusion model, according to an implementation. At 302, the method 300 may include receiving inference inputs, which may include a clean or partially corrupted image, a layout, a prompt, or one or more random seeds. This operation may be performed by, for example, the image generation and editing subsystem 150. At 304, the method 300 may include selecting an inference mode corresponding to tasks such as image-to-layout, layout-to-image, or joint generation. This operation may be performed by, for example, the image generation and editing subsystem 150. At 306, the method 300 may include sampling independent noise levels for the image and layout modalities. This operation may be per-formed by, for example, the image sampler 121 and the layout sampler 123. At 308, the method 300 may include generating initial noisy latent representations of the image and layout by applying a forward noise-injection function. This operation may be performed by, for example, the training subsystem 120 reused in inference. At 310, the method 300 may include encoding the prompt into semantic embeddings. This operation may be performed by, for example, the training subsystem 120. At 312, the method 300 may include forwarding the noisy inputs and prompt embeddings into the unified diffusion model. This operation may be performed by, for example, the unified diffusion model 130. At 314, the method 300 may include iteratively denoising the inputs under cross-modal attention. This operation may be performed by, for example, the unified diffusion model 130. At 316, the method 300 may include producing provisional outputs in the form of reconstructed image and layout predictions. This operation may be per-formed by, for example, the unified diffusion model 130. At 318, the method 300 may include post-processing outputs, such as rescaling, decoding, or alignment of masks. This operation may be performed by, for example, the training subsystem 120 reused in inference. At 320, the method 300 may include returning the inference results.

Figure 4:
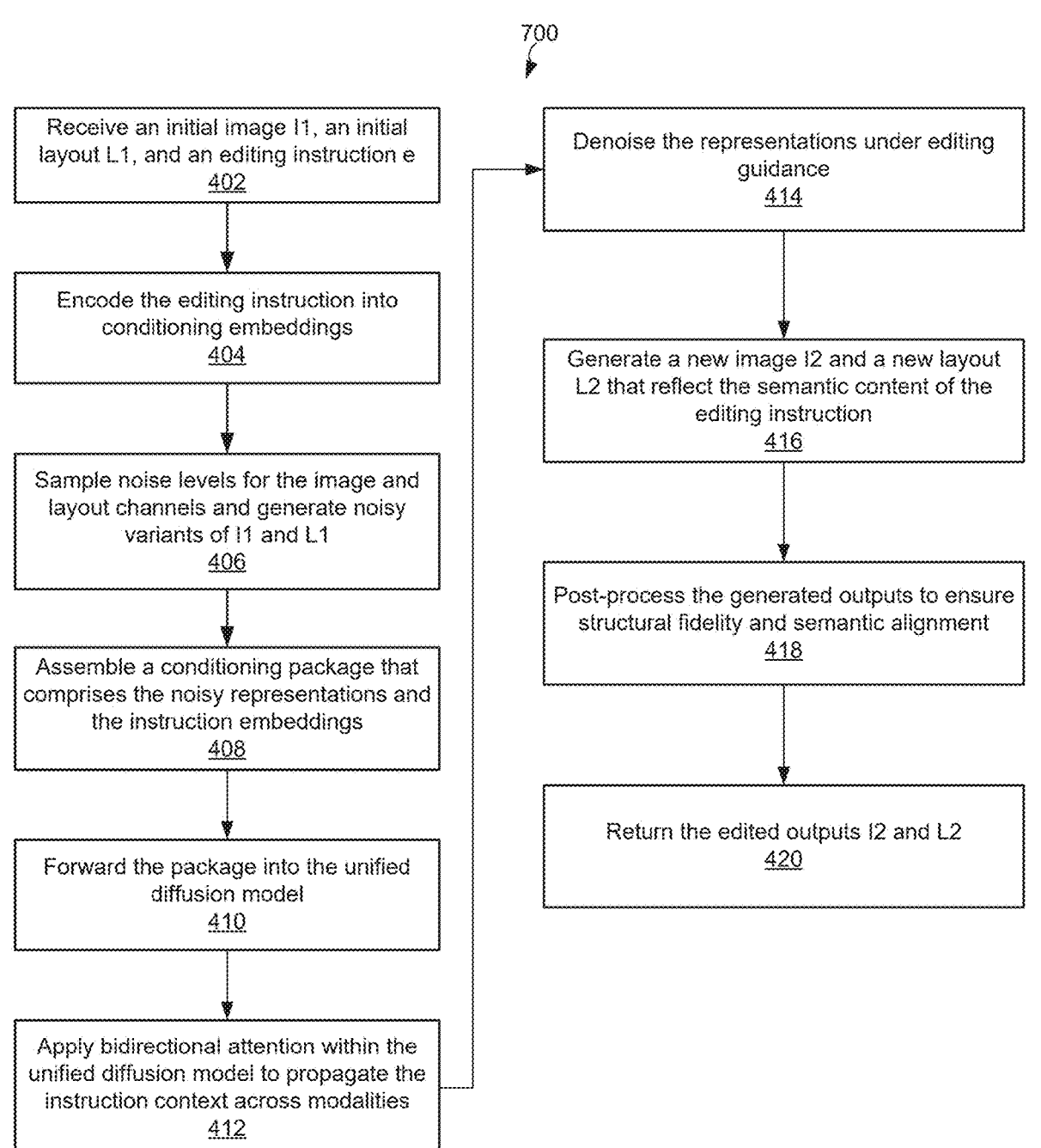
FIG. 4 is a flow diagram illustrating an example method for performing instruction-based editing inference, according to an implementation.

FIG. 4 is a flow diagram illustrating an example method 400 for performing instruction-based editing inference, according to an implementation. At 402, the method 400 may include receiving an initial image I1, an initial layout L1, and an editing instruction e. At 404, the method 400 may include encoding the editing instruction into conditioning embeddings. This operation may be performed by, for example, the training subsystem 120. At 406, the method 400 may include sampling noise levels for the image and layout channels and generating noisy variants of I1 and L1. This operation may be performed by, for example, the image sampler 121 and the layout sampler 123. At 408, the method 400 may include assembling a conditioning package that comprises the noisy representations and the instruction embeddings. This operation may be performed by, for example, the image generation and editing subsystem 150. At 410, the method 400 may include forwarding the package into the unified diffusion model. This operation may be performed by, for example, the unified diffusion model 130. At 412, the method 400 may include applying bidirectional attention within the unified diffusion model to propagate the instruction context across modalities. This operation may be performed by, for example, the unified diffusion model 130. At 414, the method 400 may include denoising the repre-sentations under editing guidance. This operation may be performed by, for example, the unified diffusion model 130. At 416, the method 400 may include generating a new image I2 and a new layout L2 that reflect the semantic content of the editing instruction. This operation may be performed by, for example, the unified diffusion model 130. At 418, the method 400 may include post-processing the generated outputs to ensure structural fidelity and semantic alignment. This operation may be performed by, for example, the training subsystem 120 reused in inference. At 420, the method 400 may include returning the edited outputs I2 and L2.

FIG. 5 is a flow diagram illustrating an example method 500 for performing layout-to-image inference with global reference conditioning, according to an implementation. At 502, the method 500 may include receiving a reference image I1, a reference layout L1, and a modified target layout L2. At 504, the method 500 may include extracting identity-preserving embeddings from the reference image I1. This operation may be performed by, for example, the image generation and editing subsystem 150. At 506, the method 500 may include encoding the layouts L1 and L2 into structural embeddings and sampling noise levels and gen-erating noisy variants of I1 and L2. These operations may be performed by, for example, the image generation and editing subsystem 150, the image sampler 121 and the layout sampler 123. At 508, the method 500 may include aligning the identity features derived from I1 with the structural slots specified in L2. This operation may be performed by, for example, the image generation and editing subsystem 150. At 510, the method 500 may include forwarding the result-ing conditioning package into the unified diffusion model. This operation may be performed by, for example, the unified diffusion model 130. At 512, the method 500 may include applying cross-modal attention to enforce both structural fidelity and visual identity preservation. This operation may be performed by, for example, the unified diffusion model 130. At 514, the method 500 may include iteratively denoising the noisy representations. This opera-tion may be performed by, for example, the unified diffusion model 130. At 516, the method 500 may include synthesiz-ing a new image I2 that is consistent with the modified layout L2 while preserving the visual identity from I1, and returning the final reference-conditioned output I2. This operation may be performed by, for example, the image generation and editing subsystem 150.

FIG. 6 is a flow diagram illustrating an example method 600 for performing layout-change inference, according to an implementation. At 602, the method 600 may include receiv-ing an original image I1, an original layout L1, and an edited image I2. This operation may be performed by, for example, the image generation and editing subsystem 150. At 604, the method 600 may include encoding the images I1 and I2 into feature embeddings and encoding the baseline layout L1 into a structural embedding. 604 may be performed by, for example, the image generation and editing subsystem 150. At 606, the method 600 may include comparing the features of I1 and I2 to detect visual differences. This operation may be performed by, for example, the image generation and editing subsystem 150. At 608, the method 600 may include aligning the detected differences with the structural slots in L1. This operation may be performed by, for example, the image generation and editing subsystem 150. At 610, the method 600 may include sampling noise and generating noisy layout representations. This operation may be performed by, for example, the layout sampler 123. At 612, the method 600 may include forwarding the conditioning package into the unified diffusion model. This operation may be performed by, for example, the unified diffusion model 130. At 614, the method 600 may include applying bidirectional attention to reconcile differences between the edited image and the baseline layout. This operation may be performed by, for example, the unified diffusion model 130. At 616, the method 600 may include iteratively denoising to refine the updated structural representation and generating an updated layout L2 consistent with the edited image I2. This operation may be performed by, for example, the unified diffusion model 130.

In some examples, the training subsystem 120 may incorporate a large language model (LLM) to improve the quality and expressiveness of prompt embeddings. While certain implementations describe encoding a natural-language prompt into semantic embeddings, the LLM can provide richer representations by leveraging pretraining across a large corpus of multimodal or text-only data. For example, the training subsystem 120 may employ the LLM to map free-form instructions, narratives, or multi-turn dialogues into structured conditioning vectors that more faithfully capture nuanced semantic and contextual intent.

In some examples, the training subsystem 120 may utilize the LLM for prompt augmentation and normalization. In such embodiments, raw text prompts may first be expanded, reformulated, or aligned with domain-specific vocabularies by the LLM before being incorporated into the training pipeline. This increases robustness to user variability in phrasing and allows the unified diffusion model 130 to consistently interpret user instructions.

In some examples, the training subsystem 120 may employ the LLM as part of an inference orchestration function. For instance, the LLM may parse natural-language task requests (e.g., "generate a layout from this image," "edit the scene to add a second object," or "translate this sketch into an image") and map them to the appropriate inference mode, such as image-to-layout, layout-to-image, joint generation, or instruction-based editing. In this way, the training subsystem 120, through the LLM, may serve as a controller that routes task-specific data into the correct inference pathways.

In some examples, the training subsystem 120 may further leverage the LLM to support cross-modal alignment between linguistic tokens in the prompt and spatial slots in the layout or regions in the image. In certain embodiments, such alignment may be performed jointly with attention heads of the unified diffusion model 130, or in a preprocessing stage where the LLM outputs token-to-region alignment maps.

In some examples, the training subsystem 120 may employ the LLM to facilitate generalization across inference modes. By abstracting prompt semantics into high-level symbolic or relational representations, the LLM may enable the same unified diffusion model parameterization to flexibly handle tasks such as instruction-based editing, reference-conditioned synthesis, and layout-change inference. This reduces the need for task-specific retraining and enhances the versatility of the unified training framework. In some examples, computer system 110 may access a model API endpoint, which may be an API that provides an interface to one or more of the models. The system may activate a model via the model API endpoint. For example, to activate a model, the computer system 110 may generate or select a prompt via a prompt generator and transmit the prompt as input via the model API endpoint. The prompt generator may be a system component that receives an input and generates a prompt for execution by one or more of the models. A prompt may be an instruction to a generative AI model to generate an output. The prompt may include a query to be answered and/or a description of the output to be generated. In some instances, the prompt may also include additional information to be used by the model to generate a response. The additional information may include contextual data, desired output formats, constraints, domain-specific knowledge, examples, templates, tone, style, localization information (such as output language, consideration of cultural information, and so forth), and/or other information that may be provided to the model to help shape its response. Thus, generation of the prompt itself can be an important factor in obtaining an appropriate response from one or more of the generative AI models.

Prompts can be in the form of a text prompt for models that can understand text inputs, machine prompts for models that can understand non-text such as vector inputs, and/or other types of prompts depending on the model for which the prompt is intended.

In some instances, the prompt generator may access one or more preconfigured prompts that may be designed by a developer and/or historical prompts previously generated by one or more users. In these instances, the prompt generator may provide a user-selectable listing of the preconfigured prompts. Preconfigured prompts may be advantageous in situations in which a prompt is found to be effective and can be re-used by the same or different users and/or to simplify and streamline prompts. In some instances, the prompt generator may modify a preconfigured prompt for dynamic prompt generation based on the preconfigured prompt.

The computer system 110 may be connected to one other devices or services via a communication network (not illustrated), such as the Internet or the Internet in combination with various other networks, like local area networks, cellular networks, or personal area networks, internal organizational networks, and/or other networks. It should be noted that the computer system 110 may transmit data, via the communication network, conveying the predictions one or more client devices. The data conveying the predictions may be a user interface generated for display at the one or more client devices, one or more messages transmitted to the one or more client devices, and/or other types of data for transmission. Although not shown, the one or more client devices may each include one or more processors.

Processor 112 may be programmed to execute one or more computer program components. The computer program components may include software programs and/or algorithms coded and/or otherwise embedded in the processor 112. The one or more computer program components or features may include various subsystems, and/or other components.

Processor 112 may be configured to execute or implement subsystems and/or other components by software; hardware; firmware; some combination of software, hardware, and/or firmware; and/or other mechanisms for configuring processing capabilities on processor 112. It should be appreciated that although various subsystems and/or other components are illustrated in FIG. 1 as being co-located in the computer system 110, one or more of these may be located remotely from the other components or features. The description of the functionality provided by the subsystems and/or other components described herein is for illustrative purposes, and is not intended to be limiting, as any of the subsystems and/or other components may provide more or less functionality than is described, which is not to imply that other descriptions are limiting. For example, one or more of the subsystems and/or other components may be eliminated, and some or all of its functionality may be provided by others of the subsystems and/or other components, again which is not to imply that other descriptions are limiting. As another example, processor 112 may include one or more additional components that may perform some or all of the functionality attributed below to one of the subsystems and/or other components.

The computer system 110 may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

The databases and data stores described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific implementations described herein. In addition, components of each system and each process can be practiced independent and separate from other components and processes described herein. Each component and process also can be used in combination with other assembly packages and processes. The flow charts, pseudocode, and descriptions thereof herein should not be understood to prescribe a fixed order of performing the method blocks described therein. Rather, the operations may be performed in any order that is practicable including simultaneous performance of at least some operations. Furthermore, each of the methods or pseudocode may be performed or executed in computer code by one or more of the system features illustrated in the Figures.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for training a unified diffusion model with a unified objective that enables independent injection of image noise and layout noise, the method comprising:

accessing a plurality of image-layout-prompt triplets, each image-layout-prompt triplet comprising an image, a layout, and a prompt;

for each image-layout-prompt triplet:

independently sampling an image noise level from a first predefined distribution and a layout noise level from a second predefined distribution;

corrupting the image and the layout based on the respective noise levels to produce corrupted modalities;

encoding the prompt into conditioning embeddings;

providing the corrupted modalities and conditioning embeddings to the unified diffusion model;

causing the unified diffusion model to generate a reconstructed image and a reconstructed layout; and updating one or more parameters of the unified diffusion model based on a training objective that balances fidelity of the reconstructed image and fidelity of the reconstructed layout.

2. The method of claim 1, wherein the first predefined distribution and the second predefined distribution differ, such that the image and layout modalities are subjected to different noise schedules during training.

3. The method of claim 1, wherein the first predefined distribution is configured to emphasize low or moderate noise levels, and the second predefined distribution is configured to emphasize higher noise levels.

4. The method of claim 1, wherein corrupting the image and the layout comprises combining each modality with randomly generated noise samples in proportion to the independently selected noise levels.

5. The method of claim 1, wherein the independent sampling exposes the unified diffusion model to diverse training conditions including: a nearly uncorrupted image with a heavily corrupted layout, a heavily corrupted image with a nearly uncorrupted layout, and both modalities partially corrupted.

6. The method of claim 5, wherein under the diverse training conditions the unified diffusion model learns to reconstruct a heavily corrupted modality using contextual information from a less corrupted modality.

7. The method of claim 1, wherein the training objective applies a configurable weighting factor to adjust the relative emphasis placed on reconstructing the image versus reconstructing the layout.

8. The method of claim 1, further comprising reseeding the first predefined distribution and the second predefined distribution across training epochs such that previously used triplets are encountered under different combinations of noise levels.

9. The method of claim 1, wherein the independent sampling improves generalization of the unified diffusion model to inference tasks including image-to-layout conversion, layout-to-image generation, joint synthesis of images and layouts, and instruction-based editing, without requiring task-specific retraining.

10. A system for generating an image, comprising:
a processor programmed to:
    receive inference inputs comprising at least one of an image, a layout, or a prompt;
    independently select an image noise level and a layout noise level from respective predefined distributions;
    apply corruption to the image and the layout based on the independently selected noise levels to generate corrupted modalities;
    encode the prompt into conditioning embeddings;
    provide the corrupted modalities and conditioning embeddings to a unified diffusion model; and
    generate a reconstructed image and a reconstructed layout that are mutually consistent and semantically aligned with the prompt.

11. The system of claim 10, wherein the unified diffusion model applies bidirectional cross-modal attention to refine the corrupted modalities using contextual information across both the image and layout channels.

12. The system of claim 10, wherein the predefined distribution for the image noise level and the predefined distribution for the layout noise level differ to expose the unified diffusion model to asymmetric corruption conditions during inference.

13. The system of claim 10, wherein the processor is further programmed to select an inference mode from a group comprising: image-to-layout prediction, layout-to-image generation, and joint generation of image and layout.

14. The system of claim 13, wherein in the image-to-layout mode the image noise level is selected to be low while the layout noise level is selected across a broader range, thereby enabling layout inference conditioned on a substantially uncorrupted image.

15. The system of claim 13, wherein in the layout-to-image mode the layout noise level is selected to be low while the image noise level is selected across a broader range, thereby enabling image generation conditioned on a substantially uncorrupted layout.

16. The system of claim 13, wherein in the joint generation mode both the image noise level and the layout noise level are selected across a range, thereby enabling simultaneous synthesis of an image and layout under guidance of the prompt.

17. The system of claim 10, wherein to perform instruction-based editing, the processor is further programmed to:
    access an initial image, an initial layout, and an editing instruction;
    encode the editing instruction into conditioning embeddings;
    apply independent noise to the initial image and layout; and
    generate an updated image and an updated layout that reflect the editing instruction.

18. The system of claim 17, wherein the unified diffusion model aligns embeddings of the editing instruction with structural elements of the layout such that edits are applied consistently across both the image and the layout modalities.

19. A non-transitory computer-readable medium storing instructions that, when executed by one or more processors, cause the one or more processors to:
    receive inference inputs including at least one of an image, a layout, or a prompt;
    independently select noise levels for an image modality and a layout modality;
    corrupt the inference inputs based on the independently selected noise levels;
    assemble a conditioning package comprising the corrupted modalities, prompt embeddings, and metadata identifying the noise levels;
    forward the conditioning package into a unified diffusion model; and
    iteratively denoise the corrupted modalities using the unified diffusion model to produce inference results comprising a generated image and/or a generated layout.

20. The non-transitory computer-readable medium of claim 19, wherein independent sampling of the noise levels enables the unified diffusion model to generalize across multiple inference tasks without requiring task-specific retraining.

* * * * *